3,183,928
AUTOMATIC SHUT-OFF VALVE
Peretz Rosenberg, Beth-Shearim, Israel
Filed Nov. 13, 1962, Ser. No. 236,815
Claims priority, application Israel Nov. 23, 1961
7 Claims. (Cl. 137—460)

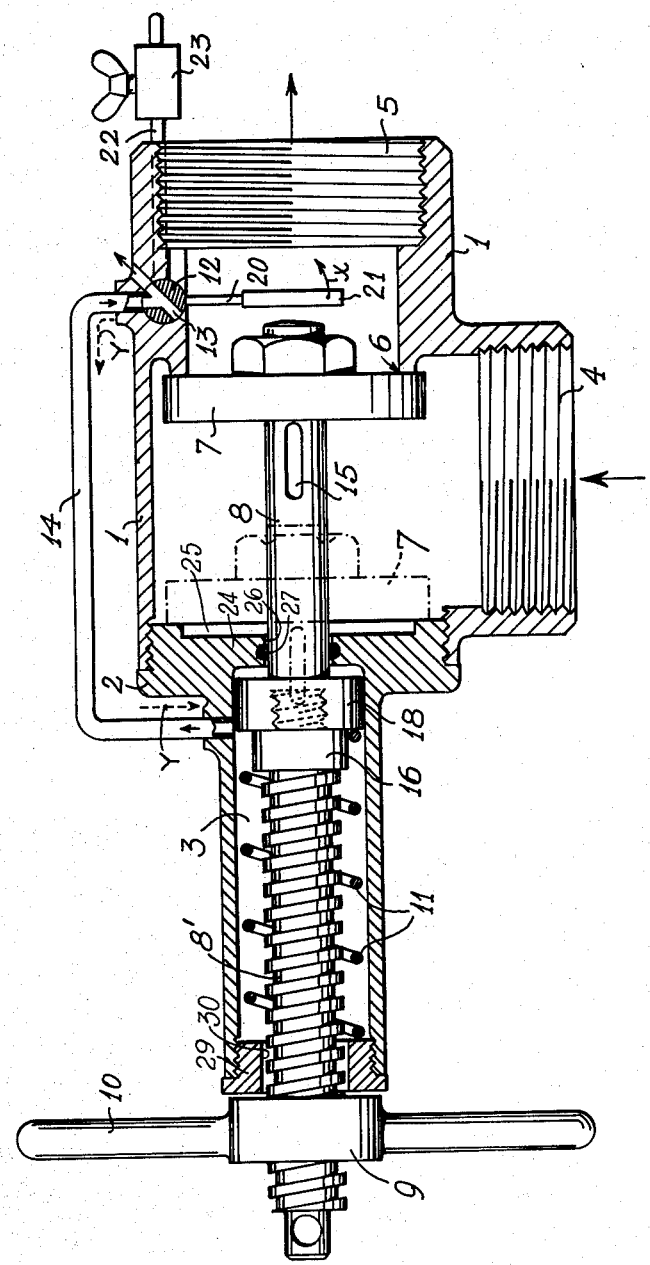

The present invention relates to a shut-off valve intended to control a feed line or conduit through which a fluid flows. It is the object of this invention to provide a valve which closes automatically and shuts off the flow in the conduit which it controls, whenever a fault or leak develops in the downstream part of the said conduit, i.e. in the part beyond the new valve in the sense of the direction of the flow, or whenever the upstream pressure drops below a minimum value.

For a better understanding of the purpose which is to be served by the new valve, the following may be stated: A field or orchard is irrigated by a number of sprinklers which are fed by a pipe conduit branched off from a main. At the head of a feed conduit (which may serve one or more sprinklers) a valve according to the invention is installed. Suppose now that at any point in the said feed conduit there develops a leak so that water flows freely from the conduit, or a sprinkler develops a fault due to which larger quantities of water gush from it than intended. Or suppose the upstream pressure drops below a minimum value, so that the sprinkler would not properly distribute the water to a wide area, but would rather concentrate it in the immediate area. In either case the new valve will automatically close and seal off the downstream part of the conduit, thereby avoiding flooding and other undesirable consequences of the leak or fault. This is, of course, one example only for the use of the new valve, but those skilled in the art will easily see that the new valve can be put to other like purposes.

The invention will be described with reference to the single figure of the annexed drawing showing the new valve in an axial section.

The new valve has a valve chest 1 closed by a bonnet 2 in which is formed a chamber 3 coaxial with the chest 1. Into the chest 1 leads an inlet port 4 and at right angles thereto is provided the outlet port 5. In the chest 1, coaxially with outlet 5, is formed the valve seat 6 onto which closes a valve member or disc 7, held on a stem 8. The valve stem 8 extends through the bonnet 2 into the chamber 3, through it and out of it at its far end. The portion of the stem 8 within the chamber 3 is formed with a screw thread 8' onto which fits a nut 9 which is provided with handle bars 10. Around the screw-threaded portion 8' of stem 8 extends a spring 11, bearing with its one end against the end wall of the chamber 3 and with its other end against a plunger-like thickened part 18 of stem 8. In the wall of the valve chest 1, in its downstream part, there is provided a cock 12 having a Y-bore 13. Cock 12 is in a bypass 14 leading into chamber 3. To the cock 13 is fixed an operator means for selectively controlling the cock, the operator comprising an arm 20 carrying at its free end a plate or disc 21, which normally lies in the path of the flow. Outside the valve chest there is fixed to the cock 12 a rod 22 on which slides an adjustable counterweight 23. Into the stem 8, just behind the disc 7, is milled a groove 15.

Preferably the screw-threaded part of stem 8 is detachable from the part fixed to the disc 7, for example by having part 8' screw-threaded at its far end 16 into the said thickened part 18 of stem 8.

The right end wall 24 of bonnet 2 separates the interior of chest 1 from chamber 3. When valve disc 7 is in its open position (as shown in dotted lines), it abuts against this wall. The face of wall 24 confronting valve disc 7 is formed with a recess 25 of disc-shape, but of smaller diameter than that of valve disc 7. Recess 25 communicates with the opening, indicated at 26, through which valve stem 8 passes from chamber 3 into the interior of chest 1. A sealing ring 27 may be provided in opening 26, if desired.

The opposite end of bonnet 2 is closed by an end plug 29 having a central opening 30 through which threaded part 8' passes.

To open the valve the nut 9 is turned by means of the handle bars, thereby pulling the stem outwardly and compressing the spring. While the valve stem moves outwardly the interior of the chest 1 is, of course, filled with water which has entered through inlet 4. As soon as the valve disc 7 is lifted from seat 6 the water starts flowing into the downstream part of the chest and out through outlet 5, say into a feeder line. Shortly before the valve disc 7 reaches its extreme open position, i.e. the extreme left hand position in the drawing, the groove 15 establishes communication between the valve chest and the chamber 3, so that the latter fills with water. Immediately after this the disc 7 assumes the position indicated by dash-dotted lines, whereupon there is no communication between the interior of the valve chest and the chamber 3. There is however, communication between chamber 3 and recess 25, this communication being established through groove 27.

Normally, threaded part 8' is then detached from thickened part 18 of the valve stem 8 by turning it by means of a key or wrench applied at its outer end.

Now water can freely flow from the inlet 4 to the outlet 5 and the pressure on the valve disc keeps the valve open, provided of course, that the pressure overcomes the strength of spring 11, which is appropriately dimensioned. While this "normal" condition prevails the cock 12 is in the position shown in the drawing. It will be seen that the interior of chamber 3 is open to the atmosphere through bypass 14 and the two arms of the bore 13 in cock 12. Thus no pressure (beyond atmospheric pressure) prevails in the chamber 3, except the pressure of the spring 11 urging the valve onto its seats, this pressure, however, being overcome by the pressure of the water from the mains.

The cock 12 is not influenced at all by the flow in the path of which the plate 21 lies, since the counterweight 23 can be so set that it neutralizes the forces acting on the plate 21 and tending to turn the cock. If, however, the rate of flow increases, say due to a leak in the downstream part of the conduit attached to the outlet 5, the increase will cause the arm 20 to swing out in the direction of the arrow x, owing to the action of the flow on plate 21, overcoming the weight 23 tending to keep arm 22 down. The cock will turn, causing the arm 22 to swing up. Thereby communication will be established by cock 12 and its bore 13 between the interior of chest 1 and the chamber 3, water flowing into the latter as indicated by the arrows y. In this position there will act on the valve disc 7, at its lower side, through groove 15 and recess 25, the full pressure of the mains and at its upper side the same pressure, plus the pressure of spring 11. This will cause the valve to close. The valve does not close suddenly and with a knock on its seat, since the thickened part 18 of stem 8, acting like a piston, pushes the water from chamber 3 out into the downstream part of the chest 1, through bypass 14. This has a braking effect on the movement of the valve disc.

The thickened part or piston 18 need not be watertight with respect to the walls of chamber 3 as the valve will function properly even if a small amount of water does pass to the left side of the chamber and out through the opening 30 in end plug 29. The thickened part 18, however, should be sufficiently close to the walls of chamber 3 so that when the communication through bypass 14 is established the pressure on the reverse side of the valve disc 7, applied from chamber 3 through groove 15 and recess 25, will be sufficient when acting conjointly with the force of spring 11 to overcome the inlet pressure force on the forward side of the valve disc, so that the valve disc 7 will close. Moreover, the pressure in chamber 3 can be further maintained by bringing threaded part 8' all the way outwardly (leftwardly) through the opening in end plug 29 so that its thickened part 16 tightly abuts against the end plug 29, thereby sealing the chamber 3 from the outside without the necessity of using seals or the like in end plug 29.

When the valve has closed, the weight 23 will pull the arm 22 down, closing the cock again towards the interior of the valve chest. The weight 23 will be set in accordance with the "normal" and permissible rate of flow which can be determined by experience with a particular system or plant. It is understood that the valve has to be opened again by hand.

It will also be appreciated that the valve will also close when the pressure in the line drops below a minimum value, namely that value needed to overcome the force of spring 11. Thus, the valve senses (and automatically closes as a result) both excessive flow through the outlet, and a drop in the inlet pressure below a minimum value. This latter function is important particularly in agricultural sprinkler systems, to prevent water wastage when the main pressure drops below the value necessary for satisfactory distribution of the water by the sprinkler. Also, if desired to closed the valve from a remote location, as for example in the situation where it may be desired to close a plurality of valves controlling a plurality of sprinklers supplied from a main conduit, it is only necessary to close the main conduit, whereupon the fluid pressure in the valves drops and causes them all to close automatically.

The valve may also be controlled manually by lifting up arm 22, which causes the cock 12 to move in the same manner as described earlier to close the valve.

Whenever the valve is opened it is advisable, for automatic operation, to remove part 8' of the stem by screwing it out of engagement with the other part of the stem (at its end 16). Otherwise, nut 9 is to be removed. If it is not desired to have automatic operation, then threaded part 8' is retained in end 16 of the valve stem 8, and also nut 9 is retained, whereby the valve can only be closed by turning handle bars 10.

Incidentally, there may be provided a clockwork or hydraulic means which after a certain, predetermined time close cock 12, so as to shut off the flow to the conduit controlled by the valve. Thus, the new valve can serve this additional purpose.

What I claim is:

1. A valve, comprising: a valve chest having an inlet port and an outlet port; a valve seat between the two ports; a valve member movable from an open position away from said valve seat to a closed position against said valve seat; spring means biasing said valve member to its closed position; means enabling the manual opening of said valve member against said spring and inlet pressure; said valve member being disposed with respect to said inlet port so that when the valve member is in its open position the inlet pressure normally retains the valve member in said open position against the action of said spring; a chamber; a bypass enabling communication to be established between the outlet port of said chest and said chamber; a cock in said bypass movable from a normal position interrupting said communication to an actuated position establishing said communication; operator means for moving said cock between said positions; and means operative when said communication is established to apply a force on said valve member which, when added to the force applied by said spring, is sufficient to move it to its closed position; whereby said valve, when opened, will automatically close upon the actuation of said operator means or upon the drop of the inlet pressure below the amount necessary to overcome said spring means.

2. A valve as defined in claim 1, wherein the said chamber is disposed at one side of said chest and has a common wall therewith, said last-mentioned means comprising a stem connected to the valve member and passing through an opening in said wall from the chest into said chamber, the valve member when in its open position abutting against said wall, said wall being recessed in an area adjacent to the opening thereof, said stem including a groove extending from the recess into said chamber when the valve member is in its open position, said groove and recess causing the pressure in said chamber to be applied to the valve member in opposition to the inlet pressure applied to the valve member when said communication is established, thereby permitting the spring means to move the valve member to its closed position.

3. A valve as defined in claim 2, wherein said valve stem portion contained in the chamber is thickened to a diameter corresponding to the chamber so as to act as a piston against any fluent material in the chamber for braking the valve member when it moves to its closed position by said spring means.

4. A valve as defined in claim 1, wherein said operator comprises an arm in the path of the fluid flowing through said outlet port, said arm being responsive to the rate of flow of said fluid to operate said cock to move same to the actuated position when the fluid flows through the outlet port at an excessive rate.

5. A valve as defined in claim 4, wherein said arm includes a member extending exteriorly of said valve and carrying an adjustable weight for adjusting said operator, said member also permitting manual operation of said operator.

6. A valve as defined in claim 1, wherein said manual opening means includes a threaded member within said chamber, said threaded member being detachable from said valve member, and handle means disposed exteriorly of said valve and threadedly engaging said threaded member for manually opening said valve member.

7. A valve, comprising: a valve chest having an inlet port and an outlet port; a valve seat between the two ports; a valve member movable from an open position away from said valve seat to a closed position against said valve seat; spring means biasing said valve member to its closed position; said valve member being disposed with respect to said inlet port so that when the valve member is in its open position the inlet pressure normally retains the valve member in said open position against the action of said spring; a chamber to one side of said valve chest; a wall common to said chamber and said chest and having an opening therethrough; a stem connected to the valve member and passing through said opening into said chamber, the valve member when in its open position abutting against said wall; said wall being recessed in an area adjacent to the opening therein; said stem being formed with a groove extending from the recess into said chamber when the valve member is in its open position; means for increasing the pressure in said chamber; said groove and recess causing the pressure in said chamber to be applied to the valve member in opposition to the inlet pressure when the valve member is in its open position, whereby the valve member closes under the action of said spring when the pressure in said chamber increases sufficiently to offset the inlet pressure.

References Cited by the Examiner

UNITED STATES PATENTS

| | | | |
|---|---|---|---|
| 1,466,412 | 8/23 | Samain | 137—050.23 XR |
| 2,029,202 | 1/36 | Shepherd | 251—227 XR |
| 2,485,504 | 10/59 | Morgan | 251—324 |
| 2,943,636 | 7/60 | Reed et al. | 137—460 XR |

FOREIGN PATENTS 1,263,250   5/61   France.

ISADOR WEIL, *Primary Examiner.*